(12) United States Patent
Haynes et al.

(10) Patent No.: US 11,190,368 B1
(45) Date of Patent: Nov. 30, 2021

(54) REAL TIME DATA UPDATE FOR CHANNEL PREVIEW

(71) Applicant: Slack Technologies, Inc., San Francisco, CA (US)

(72) Inventors: Lynsey Haynes, San Francisco, CA (US); Serguei Mourachov, Vancouver (CA); James Scheinblum, Oakland, CA (US); Vahakn Papazian, San Francisco, CA (US); Christopher David Montrois, Louisville, CO (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

(21) Appl. No.: 16/870,713

(22) Filed: May 8, 2020

(51) Int. Cl.
*H04L 12/18* (2006.01)
*H04L 12/58* (2006.01)

(52) U.S. Cl.
CPC ........ *H04L 12/1813* (2013.01); *H04L 12/185* (2013.01); *H04L 51/08* (2013.01); *H04L 51/24* (2013.01)

(58) Field of Classification Search
None
See application file for complete search history.

(56) References Cited

U.S. PATENT DOCUMENTS

| 2002/0016163 | A1* | 2/2002 | Burgan | H04L 12/1827 |
| | | | | 455/412.2 |
| 2013/0262591 | A1* | 10/2013 | Beslic | H04N 21/4788 |
| | | | | 709/206 |
| 2016/0217700 | A1* | 7/2016 | Zimmer | G09B 5/12 |
| 2017/0346777 | A1* | 11/2017 | Kim | G06F 3/0482 |
| 2018/0287982 | A1 | 10/2018 | Draeger et al. | |
| 2020/0127951 | A1* | 4/2020 | Shah | H04L 51/063 |

OTHER PUBLICATIONS

David Auberbach, "Re-Animator. How Stewart Butterfield created Flickr and Slack out of the ashes of failed projects" online retrieved May 9, 2019. Retrieved from the Internet: <URL https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Jeffrey R Swearingen
(74) *Attorney, Agent, or Firm* — Lee & Hayes, P.C.

(57) ABSTRACT

Updates to data associated with a communication channel of which a user is not a current member are described herein. In an example, server(s) associated with a group-based communication platform can cause at least one communication channel to be presented via a user interface output via a display of a user computing device operable by a user. The user may not be a current member of the communication channel. The server(s) can receive a request to preview the communication channel and, based at least in part on receiving the request, can cause a preview of the communication channel to be presented via the user interface. The preview can present data associated with the communication channel via the user interface. The server(s) can send, to the user computing device, updated data associated with the communication channel while the preview is being presented via the user interface.

20 Claims, 6 Drawing Sheets

(56) References Cited

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield on How Slack Became A $2.8 Billion Unicorn", Forbes, [online][retrieved May 9, 2019]. Retrieved from the Internet: <URL https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T et al., "Chocoa Communicator—A New Communication System Based on Awareness and Text Communications", FUJITSU Sci. Tech. J., 36,2, (Dec. 2000) pp. 154-161.
Oikarinen, J. & Reed, D., "Internet Relay Chat Protocol", Request for Comments: 1459, Network Working Group, [online][retrieved May 30, 2019], Retrieved from the Internet: <URL: https://www.rfc-editor.org/rfc/rfc1459.txt>. (dated May 1993) 57 pages.
Ernie Smith, "Picking Up The Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

REAL TIME DATA UPDATE FOR CHANNEL PREVIEW

TECHNICAL FIELD

A group-based communication platform can leverage a network-based computing system to enable users to exchange data. In an example, users of the group-based communication platform can communicate with other users via communication channels (or "channels"). A communication channel, or other virtual space, can be a data route used for exchanging data between and among systems and devices associated with the group-based communication platform. For example, a communication channel may be established between and among various user computing devices, allowing these user computing devices to communicate and share data between and among each other over one or more networks. That is, in some examples, the group-based communication platform can be a channel-based messaging platform and/or hub for facilitating communication between and among users. In some examples, data associated with a communication channel can be presented via a communication channel user interface. In some examples, the communication channel user interface can present a data feed indicating messages posted to and/or actions taken with respect to a particular communication channel.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The figures are not drawn to scale.

DETAILED DESCRIPTION

Figure 1:
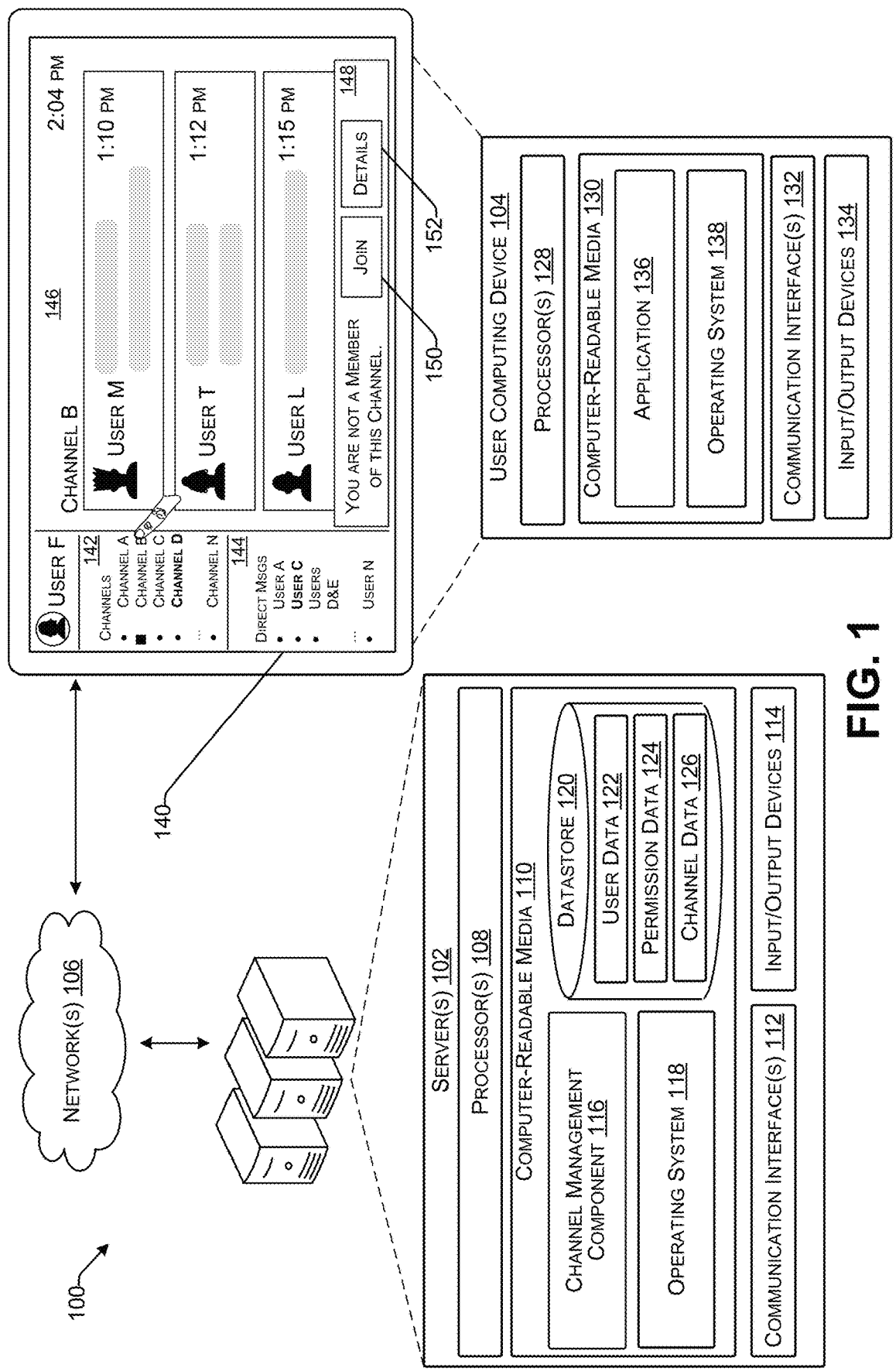
FIG. 1 illustrates an example environment for performing techniques described herein.

Real time updates to data associated with a communication channel of which a user is not a current member are described herein. In an example, a user can utilize communication services available via a group-based communication platform, which, in some examples can be a channel-based messaging platform and/or any other hub for facilitating communication between and among users. For instance, a user of the group-based communication platform can communicate with other users via communication channels (or "channels"). A communication channel, or other virtual space, can be a data route used for exchanging data between and among systems and devices associated with the group-based communication platform. For example, a communication channel may be established between and among various user computing devices, allowing these user computing devices to communicate and share data between and among each other over one or more networks. In some examples, data associated with a communication channel can be presented via a communication channel user interface. In some examples, the communication channel user interface can present a data feed indicating messages posted to and/or actions taken with respect to communication channels to which a user is a current member, as well as communication channels to which the user is not a current member but has requested to preview.

In at least one example, the user can be a member of one or more communication channels, and, in such an example, server(s) associated with the group-based communication platform can send data associated with the one or more communication channels to a user computing device as it is received (e.g., in real time or in near-real time). That is, when a user is a member of a communication channel and another member of the communication channel posts a message to the communication channel, the server(s) can send updated data to a user computing device of the user such that the communication channel can be updated in real time or near-real time to include the message.

However, in some examples, the group-based communication platform can have one or more communication channels of which the user is not a member. In some examples, a user can choose not to be a member of some communication channels to avoid being overwhelmed with data and/or updates. In some examples, a user may not be a member of a communication channel because the user is not aware of the communication channel, does not have permission to be a member of the communication channel, or for a variety of other reasons. In an effort to conserve computing resources, enforce security permissions, and/or improve performance of the group-based computing platform, the server(s) can refrain from sending data and/or updated data to the user computing device when such data and/or updated data is associated with a communication channel of which the user is not a current member.

In some situations, the user may desire to preview a communication channel of which he or she is not a member. In those situations, the user can request to view the communication channel, for example, as a preview of the communication channel. So long as the user is permitted to access the communication channel, the server(s) can cause a preview user interface (i.e., a user interface associated with a preview of the communication channel) to be presented via a user computing device of the user. In existing technologies, when the user is presented with a preview of a communication channel (e.g., via a preview user interface), the user may view data previously posted, or otherwise associated with, the communication channel up to the time at which the user requested to view the communication channel. However, because the user is not a current member of the communication channel, in existing technologies, the server(s) associated with the group-based communication platform do not send any data and/or updated data to the communication channel. As such, even if other users are updating data associated with the communication channel (e.g., by posting new content and/or messages in the communication channel, adding and/or removing members from the communication channel (e.g., changing membership of user(s) associated with the communication channel), uploading and/or removing file(s) (e.g., file attachment(s)) from the communication channel, adding and/or removing application(s) from the communication channel, adding, modifying, and/or removing a description from the communication channel, modifying a property of the communication channel, etc.), the user of the existing technologies is not able to see any of the updated data because the server(s) are not sending such updated data to the user computing device of the user (e.g., because the user is not a current member of the communication channel).

If the user subsequently joins the communication channel as a member, all of the data and/or updates received by the communication channel between when the user requested to preview the communication channel and joined the communication channel can be sent to the user computing device, and at least some of the data and/or updates can be presented via a user interface associated with the communication channel. That is, in existing technologies, when the user subsequently joins the communication channel, the data associated with the communication channel can include data that was not presented to the user in the preview of the communication channel. This inconsistency or "jump" can be confusing for users and can cause a negative user experience.

Techniques described herein enable the user to view the updated data even though the user is not a current member of the communication channel. That is, techniques described herein enable a user to view updated data associated with a communication channel he or she is previewing as long as the user is viewing a preview user interface associated with the communication channel (or an account of the user is otherwise temporarily associated with the communication channel, as described below). In an example, the server(s) associated with the group-based communication platform can temporarily associate a user with the communication channel so that the server(s) can send data and/or updated data to a user computing device of the user while the user is viewing the preview user interface, in real time or near-real time, even though the user is not a current member of the communication channel. As a result, the user can "peek" into the communication channel—thereby seeing data associated with the communication channel as though the user is a member of the communication channel—as long as the user is viewing a preview user interface associated with the communication channel. In some examples, the user may view any messages, files, documents, links, membership lists, organization lists, and other properties (e.g., collectively "content") of the communication channel. In some examples, while the user can view the content within the communication channel, the user may not be permitted to interact with content in the communication channel, edit content in the communication channel, or post any messages or data to the communication channel. When the user leaves the preview user interface, the server(s) can terminate the association between the user and the communication channel, and the user computing device may no longer receive data and/or updated data from the server(s) for the communication channel.

For example, server(s) associated with the group-based communication platform can receive, from a user computing device of a user associated with the communication platform, a request to preview a communication channel of which the user is not a current member. Based at least in part on receiving the request, the server(s) can cause a preview user interface to be presented via a display of the user computing device. In at least one example, the preview user interface can present data associated with the communication channel. In an example, data associated with the communication channel can be updated by another user. In such an example, the server(s) can detect that the data associated with the communication channel has been updated by another user while the preview user interface is being presented via the display of the user computing device. Based at least in part on detecting that the data has been updated by the other user, the server(s) can cause the preview user interface to be updated to include an update to the data associated with the communication channel.

In an additional or alternative example, the server(s) associated with the group-based communication platform can cause one or more indications associated with one or more communication channels to be presented via a user interface output on a display of a user computing device operable by a user. In an example, the user may not be a current member of a communication channel of the plurality of communication channels. The server(s) can receive, from the user computing device and via the user interface, a request to preview the communication channel. Based at least in part on receiving the request, the server(s) can cause a preview of the communication channel to be presented via the user interface. In at least one example, the preview can present data associated with the communication channel via the user interface. The server(s) can send updated data associated with the communication channel to the user computing device while the preview is being presented via the user interface.

That is, techniques described herein enable users to modify communication channel membership "on the fly" (e.g., in real time or near-real time). This allows users to receive data and/or updates for communication channels for which they desire to receive such data and/or updates, but also enables users to access data and/or updates in other communication channels of which they are not members (but have permission to access). Such techniques enable the group-based communication platform to maintain performance and conserve computing and/or network resources, by refraining from sending data and/or updates for communication channels of which the user is not a member. That is, techniques described herein reduce the amount of data exchanged between and among users of the group-based communication platform and stored on user computing devices associated with the group-based communication platform. Yet, techniques described herein still enable users to access data associated with other channels (for which they have permission to access) in real time or near-real time. That is, techniques described herein provide both performance efficiencies and access control, by allowing users to preview the data they are interested in and allowed to view, and refraining from transmitting data to user computing devices and/or access points that are not previewing communication channels of which users are not currently members. The aforementioned techniques further enable cleaner, less cluttered user interfaces, while still allowing users to preview data associated with other channels (for which they have permission to access) in real time or near-real time. Techniques described herein therefore provide an improved user experience for users of the group-based communication platform.

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such users can be defined by common access credentials, group identifiers, domains, or the like. In some examples, the communication platform can be a hub, offering a secure and private virtual space to enable users to chat, meet, call, collaborate, or otherwise communicate between or among each other.

In at least one example, the example environment 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the group-based communication platform. A user can be an individual, a group of individuals, an employer, an enterprise, an organization, or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units, state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a channel management component 116, an operating system 118, and a datastore 120.

In at least one example, the channel management component 116 can manage communication channels. That is, in at least one example, the communication platform can be a channel-based messaging platform, that in some examples, can be usable by group(s) of users, as described above. Users of the group-based communication platform can communicate with other users via communication channels, as described above. In at least one example, the channel management component 116 can establish a communication channel between and among various user computing devices, allowing these user computing devices to communicate and share data between and among each other. In at least one example, the channel management component 116 can manage such communications and/or sharing of data. In some examples, data associated with a communication channel can be presented via a communication channel user interface. In at least one example, the channel management component 116 can manage the generation, presentation, and/or updating of communication channel user interfaces. Additional details of operations that can be performed by the channel management component 116 are described below.

While the channel management component 116 is shown as a single component, in some examples, the channel management component 116 can comprise multiple components, which, in some examples, can be distributed across individual ones of the server(s) 102. For instance, in at least one example, a first component, associated with a first server of the server(s) 102, can handle temporary (e.g., of limited duration) subscriptions and/or memberships associated with communication channels (e.g., in the case of a user requesting to preview a channel), while a second component, associated with a second server of the server(s) 102, can handle permanent (e.g., of unlimited duration) subscriptions and/or memberships associated with communication channels. In other examples, the first and second components can be associated with a same server of the server(s) 102.

In at least one example, the operating system 118 can manage the processor(s) 108, computer-readable media 110, hardware, software, etc. of the server(s) 102.

In at least one example, the datastore 120 can be configured to store data that is accessible, manageable, and updatable. In some examples, the datastore 120 can be integrated with the server(s) 102, as shown in FIG. 1. In other examples, the datastore 120 can be located remotely from the server(s) 102 and can be accessible to the server(s) 102. The datastore 120 can comprise multiple databases, which can include user data 122, permission data 124, and channel data 126. Additional or alternative data may be stored in the data store and/or one or more other data stores.

In at least one example, the user data 122 can store data associated with users of the group-based communication platform. In at least one example, the user data 122 can store data in user profiles (which can also be referred to as "user accounts"), which can store data associated with a user, including, but not limited to, a user identifier, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the permission data 124 can store data associated with permissions of individual users of the group-based communication platform. In some examples, permissions can be set by the group-based communication platform, an employer, enterprise, organization, or other entity that utilizes the group-based communication platform, a team leader that utilizes the group-based communication platform for communicating with team members, an individual user, or the like. In some examples, permissions associated with an individual user can be mapped to, or otherwise associated with, an account or profile associated with the user data 122. In some examples, permissions can indicate which users can communicate directly with other users, which channels a user is permitted to access, restrictions on individual channels, and the like. In at least one example, the permissions can support the group-based communication platform by maintaining security for limiting access to a defined group of users. In some examples, such users can be defined by common access credentials, group identifiers, or the like, as described above.

In at least one example, the channel data 126 can store data associated with individual communication channels. In at least one example, the channel management component 116 can establish a communication channel between and among various user computing devices, allowing these user computing devices to communicate and share data between and among each other. In at least one example, a communication channel identification may be assigned to a communication channel, which indicates the physical address in the channel data 126 where data related to that communication channel is stored. A communication channel may be "public," which may allow any user within an organization to join and participate in the data sharing through the communication channel, or a communication channel may be "private," which may restrict data communications in the communication channel to certain users or users having particular roles (e.g., managers, administrators, etc.). In some examples, a communication channel may be "shared," which may allow users associated with different organizations to join and participate in the data sharing through the communication channel. Shared channels may be public such that they are accessible to any user of either organization, or they may be private such that they are restricted to access by certain users or users having particular roles from both organizations.

In some examples, individual organizations can be associated with a database shard (e.g., discrete, partitioned items of data that may be accessed and managed individually) within the datastore 120 that stores data related to a particular group identification. For example, a database shard may store electronic communication data associated with members of a particular organization, which enables members of that particular organization to communicate and exchange data with other members of the same organization in real time or near-real time. In this example, the organization itself is the owner of the database shard and has control over where and how the related data is stored. This can simplify many technical tasks, such as data retention, unfurling (e.g., detecting that message contents include a link, crawling the link's metadata, and determining a uniform summary of the metadata), and integration settings. In some examples, a database shard can store data related to two or more organizations (e.g., as in a shared channel).

The communication interface(s) 112 can include one or more interfaces and hardware components for enabling communication with various other devices (e.g., the user computing device 104), such as over the network(s) 106 or directly.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 128, computer-readable media 130, one or more communication interfaces 132, and input/output devices 134.

In at least one example, each processor of the processor(s) 128 can be a single processing unit or multiple processing units, and can include single or multiple computing units or multiple processing cores. The processor(s) 128 can be implemented as one or more microprocessors, microcomputers, microcontrollers, digital signal processors, central processing units, state machines, logic circuitries, and/or any devices that manipulate signals based on operational instructions. For example, the processor(s) 128 can be one or more hardware processors and/or logic circuits of any suitable type specifically programmed or configured to execute the algorithms and processes described herein. The processor(s) 128 can be configured to fetch and execute computer-readable instructions stored in the computer-readable media, which can program the processor(s) to perform the functions described herein.

The computer-readable media 130 can include volatile and nonvolatile memory and/or removable and non-removable media implemented in any type of technology for storage of data, such as computer-readable instructions, data structures, program modules, or other data. Such computer-readable media 130 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the user computing device 104, the computer-readable media 130 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 130 can be used to store any number of functional components that are executable by the processor(s) 128. In many implementations, these functional components comprise instructions or programs that are executable by the processor(s) 128 and that, when executed, specifically configure the processor(s) 128 to perform the actions attributed above to the user computing device 104. Functional components stored in the computer-readable media can optionally include an application 136 and an operating system 138.

In at least one example, the application 136 can be a mobile application, a web application, or a desktop application, which can be provided by the group-based communication platform or which can be an otherwise dedicated application. In some examples, individual user computing devices associated with the environment 100 can have an instance or versioned instance of the application 136, which can be downloaded from an application store, accessible via the Internet, or otherwise executable by the processor(s) 128 to perform operations as described herein. That is, the application 136 can be an access point, enabling the user computing device 104 to interact with the server(s) 102 to access and/or use communication services available via the group-based communication platform. In at least one example, the application 136 can facilitate the exchange of data between and among various other user computing devices, for example via the server(s) 102. In at least one example, the application 136 can present user interfaces, as described herein. In at least one example, a user can interact with the user interfaces via touch input, keyboard input, mouse input, spoken input, or any other type of input.

A non-limiting example of a user interface 140 is shown in FIG. 1. As illustrated in FIG. 1, the user interface 140 can present data associated with one or more communication channels. In some examples, the user interface 140 can include a first region 142, or sub-pane, of the user interface 140 that includes indications of communication channels associated with the group-based communication platform. In some examples, the communication channels can include public channels, private channels, shared channels, combinations of the foregoing, or the like. In some examples, the first region 142 can depict all communication channels, or a subset of all communication channels, that the user has permission to access (e.g., as determined by the permission data stored in the permission data 124). In some examples, the first region 142 can depict all communication channels, or a subset of all communication channels, that the user is a member of, and the user can interact with the user interface 140 to browse or view other communication channels that the user is not a member of but are not currently displayed in the first region 142. In some examples, different types of channels (e.g., public, private, shared, etc.) can be in different sections of the first region 142, or can have their own regions or sub-panes in the user interface 140.

In some examples, the indications can be associated with graphical elements that visually differentiate types of communication channels. For example, Channel B is associated with a square visual element instead of a circle visual element. As a non-limiting example, and for the purpose of this discussion, the square visual element can indicate that the user is not a current member of Channel B, whereas the circle visual element can indicate that the user is a current member of Channels A, C, D, and N. In some examples, additional or alternative graphical elements can be used to differentiate between public communication channels, private communication channels, shared communication channels, and the like. In other examples, channels that the user is not a current member of may not be displayed in the first region 142 or the user interface 140. In such examples, the user may navigate to a different interface (not shown) to browse additional channels that are accessible to the user but to which the user is not currently a member.

In addition to the first region 142, the user interface 140 can include a second region 144, or sub-pane, that can include indications of communications with individual users or multiple specified users (e.g., instead of all members of an organization). Such communications can be referred to as "direct messages."

The user interface 140 can include a third region 146, or sub-pane, that can be associated with communications occurring within a communication channel. In some examples, data associated with a communication channel can be presented via the third region 146. In some examples, the third region 146 can present a data feed indicating messages posted to and/or actions taken with respect to a communication channel and/or other virtual space for facilitating communications (e.g., a virtual space associated with direct message communication(s), etc.) as described herein. In some examples, such data can be posted in chronological order and can be associated with an indication of which user (e.g., member of the communication channel) posted the message and/or performed an action.

In at least one example, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. In some examples, messages can be interactable and/or editable. In some examples, messages can be broadcast (e.g., an announcement) and may not be interactable and/or editable. A message may include any text, image, video, audio, or combination thereof provided by a user (using a user computing device). For instance, the user may provide a message that includes text, as well as an image and a video, within the message as message contents. In such an example, the text, image, and video would comprise the message. In some examples, a file can be attached to a message. Each message sent or posted to a communication channel of the group-based communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

A communication channel can be associated with data and/or content other than messages, or data and/or content that is associated with messages. For example, non-limiting examples of additional data that can be presented via the third region 146 of the user interface 140 include members added to and/or removed from the communication channel, file(s) (e.g., file attachment(s)) uploaded and/or removed from the communication channel, application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

In at least one example, data associated with a communication channel can be viewable to at least some of the users of a group of users associated with a same group identifier. The format of the third region 146 may appear differently to different users; however, for members of a communication channel, the content of the communication channel (e.g., messaging communications) can be displayed to each member of the communication channel. For instance, a common set of group-based messaging communications can be displayed to each member of the communication channel such that the content of the communication channel (e.g., messaging communications) may not vary per member of the communication channel.

As described above, in at least one example, the user can desire to access data associated with Channel B. As described above, the user may not be a current member of Channel B (the square visual element in this example indicates that the user is not a current member of Channel B). The user can interact with the user interface 140, for example by providing an input associated with the indication that corresponds to Channel B. In some examples, the indication can be associated with a mechanism, that when actuated, provides the input indicating that the user desires to access data associated with Channel B. In at least one example, the application 136 can send an indication of the input to the server(s) 102. That is, the application 136 can detect the input and send a request associated with the input to the server(s) 102. The request can comprise a request to preview Channel B. In at least one example, the request can be associated with a communication channel identification that is associated with Channel B and a user identifier associated with the user.

Based at least in part on receiving the request, the channel management component 116 can determine whether the user has permission to access Channel B. That is, the channel management component 116 can utilize the user identifier associated with the request to determine whether the permissions data 124 and/or the user data (e.g., in the user data 122) indicate that the user has permission to access Channel B. Based at least in part on the user having permission to access Channel B, the channel management component 116 can access channel data associated with Channel B in the channel data 126. That is, the channel management component 116 can utilize the communication channel identification to access channel data stored in association with the physical address in the channel data 126 where related data of that communication channel is stored.

In at least one example, the channel management component 116 can send at least a portion of the channel data to the application 136 and the application 136 can present the channel data via the user interface 140 as a "preview user interface." That is, the channel management component 116 can cause the channel data associated with Channel B, or a portion thereof, to be presented via the user interface 140 as a preview of data associated with Channel B. In some examples, the preview of Channel B can be presented via the user interface 140, as shown in FIG. 1. However, in some examples, the preview of Channel B can be presented via a new user interface, a pop-up, an overlay, or other user interface element. In at least one example, the data can be presented as a "preview" in that the user may not be able to interact with the data presented via the user interface 140 (e.g., add a reaction or emoji, respond to a message, upload a file, or the like) but may be able to view the data presented via the user interface 140.

In at least one example, because the user is not a current member of Channel B, a user interface element 148 can be presented via the user interface 140 that can alert the user that they are not a current member of the communication channel and/or enable the user to join the communication channel. As an example, the user interface element 148 can include a first control 150 to enable the user to join the communication channel. In some examples, the user interface element 148 can include a second control 152 to enable the user to view details associated with the communication channel. Such details can include, but are not limited to, information about the communication channel, members of the communication channel, organizations associated with the communication channel, items pinned to the communication channel, files shared via the communication channel, or the like.

The user interface 140 is a non-limiting example of a user interface that can be presented via the user computing device 104 (e.g., by the application 136). In some examples, the application 136 can receive data from the channel management component 116 and the application 136 can generate and present the user interface 140 based on the data. In other examples, the application 136 can receive data from the channel management component 116 and instructions for generating the user interface 140 from the channel management component 116. In such an example, the application 136 can present the user interface 140 based on the instructions. Additional or alternative data can be presented via a user interface and additional or alternative configurations can be imagined.

In at least one example, the operating system 138 can manage the processor(s) 128, computer-readable media 130, hardware, software, etc. of the server(s) 102.

The communication interface(s) 132 can include one or more interfaces and hardware components for enabling communication with various other devices (e.g., the user computing device 104), such as over the network(s) 106 or directly.

The user computing device 104 can further be equipped with various input/output devices 134 (e.g., I/O devices). Such I/O devices 134 can include a display, various user interface controls (e.g., buttons, joystick, keyboard, mouse, touch screen, etc.), audio speakers, connection ports and so forth.

Figure 2:
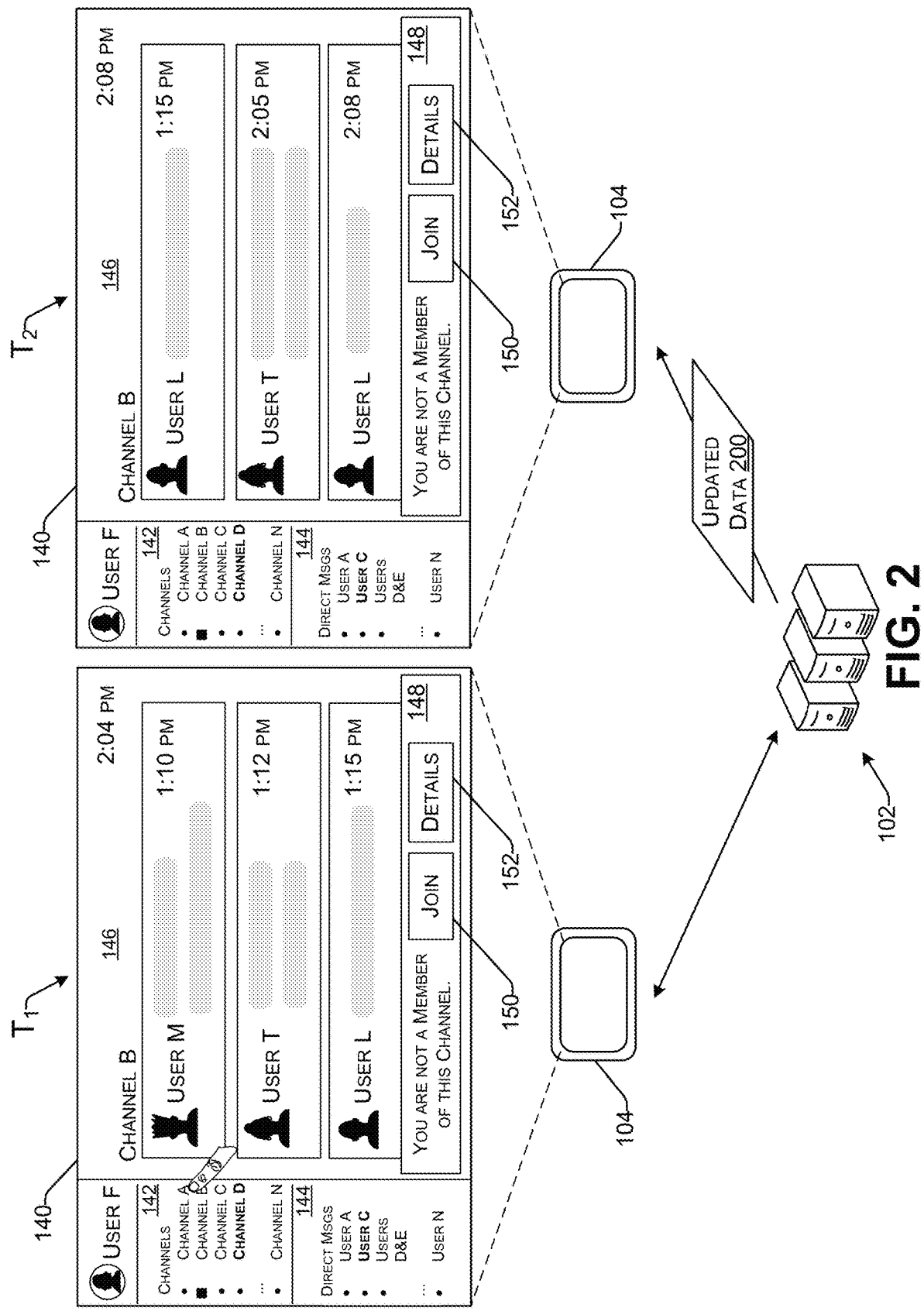
FIG. 2 illustrates example preview user interfaces, as described herein.

FIG. 2 illustrates example preview user interfaces, as described herein. As described above with reference to FIG. 1, in at least one example, the application 136 can present user interfaces, as described herein. In at least one example, a user can interact with the user interfaces via touch input, keyboard input, mouse input, spoken input, or any other type of input. FIG. 2 illustrates two instances of the user interface 140 described above with reference to FIG. 1. As illustrated and described in FIG. 1, the user interface 140 can present data associated with one or more communication channels. In some examples, the user interface 140 can include a first region 142, or sub-pane, of the user interface 140 that includes indications of communication channels associated with the group-based communication platform. In some examples, different types of channels (e.g., public, private, shared, etc.) can be in different sections of the first region 142, or can have their own regions or sub-panes in the user interface 140.

In addition to the first region 142, the user interface 140 can include a second region 144, or sub-pane, that can include indications of communications with individual users (e.g., instead of members of a channel). Such communications can be referred to as "direct messages."

The user interface 140 can include a third region 146, or sub-pane, that can be associated with communications occurring within a communication channel. In some examples, data associated with a communication channel can be presented via the third region 146. In some examples, the third region 146 can present a data feed indicating messages posted to and/or actions taken with respect to a communication channel. In some examples, such data can be posted in chronological order and can be associated with an indication of which user (e.g., member of the communication channel) posted the message and/or performed an action.

As described above with reference to FIG. 1, in at least one example, the user can desire to access data associated with Channel B. As described above, the user may not be a current member of Channel B (the square visual element in this example indicates that the user is not a current member of Channel B). The user can interact with the user interface 140, for example by providing an input associated with the indication that corresponds to Channel B. As described above, in at least one example, the application 136 can detect the input and send a request associated with the input to the server(s) 102. The request can comprise a request to preview Channel B. In at least one example, the request can be associated with a communication channel identification that is associated with Channel B and a user identifier associated with the user.

Based at least in part on receiving the request, the channel management component 116 can determine whether the user has permission to access Channel B. Based at least in part on the user having permission to access Channel B, the channel management component 116 can access channel data associated with Channel B in the channel data 126. In at least one example, the channel management component 116 can send at least a portion of the channel data to the application 136 and the application 136 can present the channel data via the user interface 140, as illustrated in FIG. 2 as a preview of Channel B that is presented via the user interface 140. In some examples, the preview of Channel B can be presented via the user interface 140, as shown in FIG. 2. However, in some examples, the preview of Channel B can be presented via a new user interface, a pop-up, an overlay, or other user interface element.

In at least one example, because the user is not a current member of Channel B, a user interface element 148 can be presented via the user interface 140 that can alert the user that they are not a current member of the communication channel and/or enable the user to join the communication channel. As an example, as described above, the user interface element 148 can include a control 150 to enable the user to join the communication channel. Furthermore, the user interface element 148 can include additional or alternative controls, such as the control 152, which enables the user to obtain details associated with the communication channel, as described above.

FIG. 2 illustrates two instances of the user interface 140, which represent the user interface 140 that is presented at two different times (e.g., $T_1$ and $T_2$). In at least one example, data associated with Channel B at a first time ($T_1$) associated with when the user requested to preview the communication channel can be presented via the user interface 140 at the first time ($T_1$). That is, at the first time ($T_1$), the channel management component 116 can access data associated with the communication channel up to the first time ($T_1$) and such data, or a portion thereof, can be presented via the user interface 140. For instance, as illustrated in FIG. 2, the most recent message posted to Channel B was at 1:15 pm.

As described above, in existing techniques, in an effort to conserve computing resources, enforce security, and/or improve performance of the group-based computing platform, the server(s) 102 may refrain from sending data and/or updated data to the user computing device 104 when such data and/or updated data is associated with a communication channel of which the user is not a current member. Because, in existing techniques, the user would not be a member of Channel B, the user would not be able to view any updates to Channel B after the first time ($T_1$). That is, in existing techniques, so long as the user views the preview user interface, the user would view the same data associated with Channel B as was presented at the first time ($T_1$).

However, as an improvement to existing techniques, the channel management component 116 can temporarily associate the user (i.e., a user account of the user) with Channel B so that the channel management component 116 can send data and/or updated data to the application 136 while the account of the user is associated with Channel B, in real time or near-real time, even though the user is not a current member of the communication channel. For example, the account of the user can be associated with Channel B so long as the user is viewing the preview user interface. That is, in at least one example, so long as the preview of Channel B is presented via the user interface 140, the channel management component 116 can send updated data 200 to the application 136. In additional or alternative examples, the temporary association between the user account and Channel B can have a predetermined time duration (e.g., 5 minutes, 30 minutes, 1 hour, 24 hours, etc.) or the preview can be conditioned on the application window being in a foreground of the display of the user computing device 104. In at least one example, the application 136 can update the user interface 140 to include updated data, as illustrated at a second time ($T_2$) in FIG. 2. As a result, the user can "peek" into Channel B—thereby seeing data associated with Channel B as though the user is a member of Channel B—as long as the user account is associated with Channel B. As described above, while previewing Channel B, the user may view any messages, files, documents, links, membership lists, organization lists, and other properties (e.g., collectively "content") of Channel B and can view any updates to such content in near-real time. In some examples, the user can view previews of such content. For instance, the use can view a preview of a message, file, document, etc. associated with Channel B. However, in some examples, while the user can view the content within Channel B, the user may not be permitted to interact with content in Channel B, edit content in Channel B, or post any messages or data to Channel B.

In at least one example, in addition to the user being able to view updates to content in Channel B, the user can view updates to details associated with the communication channel while previewing the communication channel. That is, based at least in part on the user actuating the control 152, the user interface 140 can present a details sub-pane (e.g., which can be part of the user interface 140 or a pop-up, overlay, or the like), which can include details associated with Channel B, as described above. If any details are updated while the user is previewing Channel B (e.g., viewing the preview user interface), and/or otherwise temporarily associated with Channel B, the details sub-pane can be updated to include updated details associated with Channel B. For instance, if a membership list associated with Channel B changed between the first time ($T_1$) and ($T_2$), the details sub-pane can be updated to include such a change to the membership list while the user is previewing Channel B (e.g., viewing the preview user interface) and/or is otherwise temporarily associated with Channel B.

In at least one example, when the user leaves the preview user interface (e.g., to view data associated with a different communication channel), or the temporary association otherwise expires, the channel management component 116 can terminate the association between the user and Channel B, and the application 136 may no longer receive data and/or updated data from the server(s) 102 for the communication channel. However, if the user joins Channel B (e.g., via actuation of the control 150), the channel management component 116 can update the association between the user and Channel B and, as a result, the application 136 can receive data and/or updated data from the server(s) 102 so long as the user is a member of the communication channel.

Figure 3:
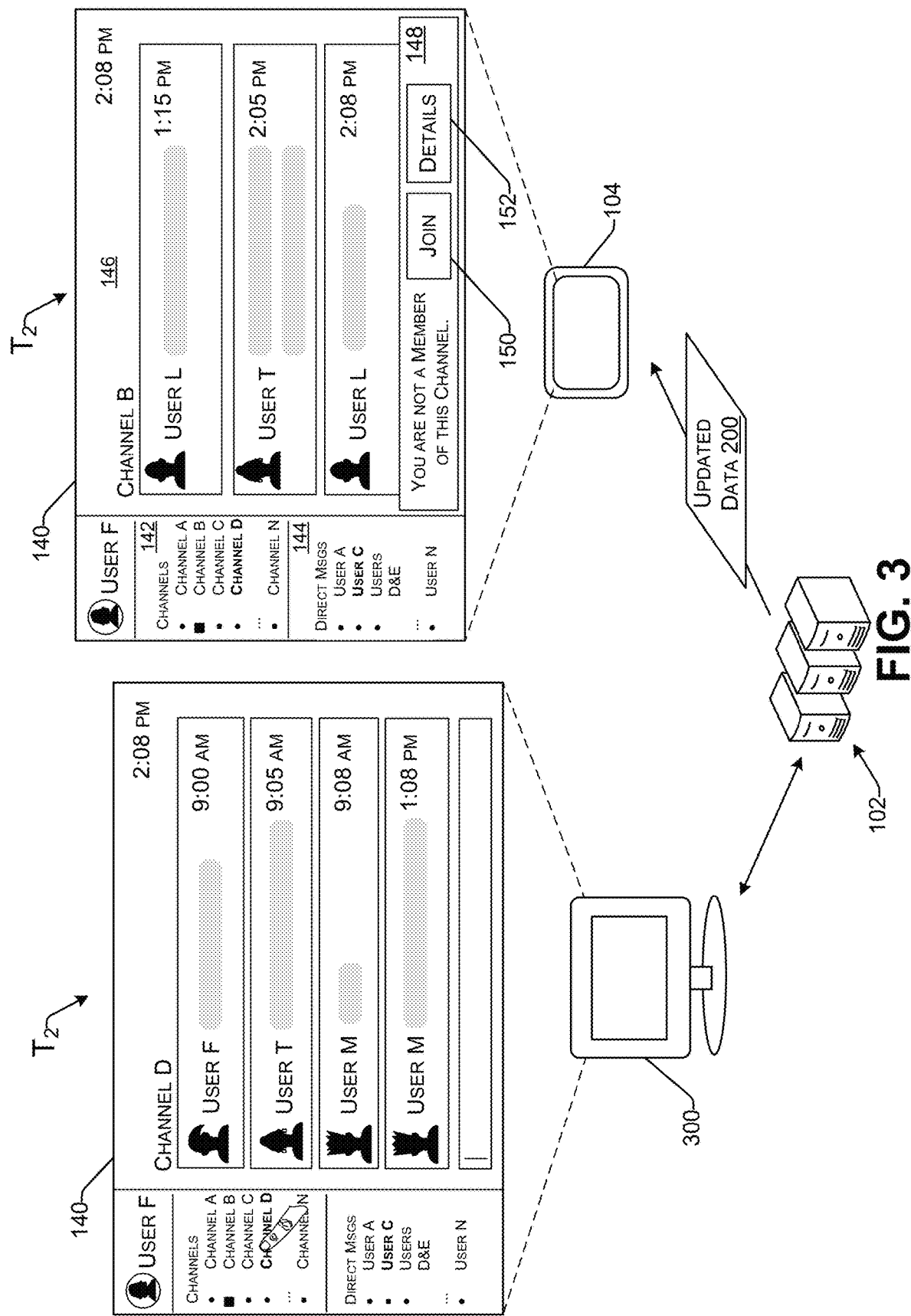
FIG. 3 illustrates example user interfaces presented via different user computing devices and/or access points, as described herein.

FIG. 3 illustrates example user interfaces presented via different user computing devices and/or access points, as described herein. In at least one example, a user can access the group-based communication platform via different user computing devices and/or access points (e.g., mobile application, desktop application, web application, etc.). In at least one example, the channel management component 116 can temporarily associate the user with Channel B on a per-device or per-access point basis. That is, for any user computing device or access point through which the user is previewing Channel B via the user interface 140, the channel management component 116 can send the updated data 200. In such an example, the channel management component 116 can associate the user, and a respective user computing device and/or access point, with Channel B. As such, the channel management component 116 can send the updated data 200 to such a user computing device and/or access point.

If the user is using the group-based communication platform via another user computing device and/or access point, such a user computing device and/or access point may not receive the updated data 200 from the server(s) 102. For example, in FIG. 3, the user can be using the user computing device 104 and another user computing device 300. The other user computing device 300 can be configured similar to the user computing device 104, described above with reference to FIG. 1. In at least one example, the user computing device 104 can be presenting a preview of Channel B via the user interface 140 but the other user computing device 300 can be viewing a different communication channel via the user interface 140. As described above with reference to FIG. 2, the user and user computing device 104 can be temporarily associated with Channel B such that the user computing device 104 can receive the updated data 200 associated with the communication channel. However, because the user and/or the user computing device 300 are not previewing Channel B via the user interface 140 and, therefore are not temporarily associated with Channel B, the user computing device 300 may not receive the updated data 200. That is, the channel management component 116 can refrain from sending the updated data 200 to the user computing device 300 in an effort to maintain performance of the group-based communication platform and/or to conserve computing resources and/or network bandwidth. If the user requests to preview Channel B via the user computing device 300, then the channel management component 116 can temporarily associate the user and the user computing device 300 with Channel B and can send the user computing device 300 updated data.

While FIG. 3 illustrates two different user computing devices (e.g., 104 and 300), the same or similar techniques can be applicable to different access points, which can be on the same or different user computing devices. That is, if a user is viewing a preview of a communication channel on a desktop application associated with the group-based communication platform, and is also accessing the group-based communication platform via a web application (but is not previewing the communication channel), the desktop application can present updated data associated with the previewed communication channel (e.g., Channel B) but the web application may not.

Figure 4:
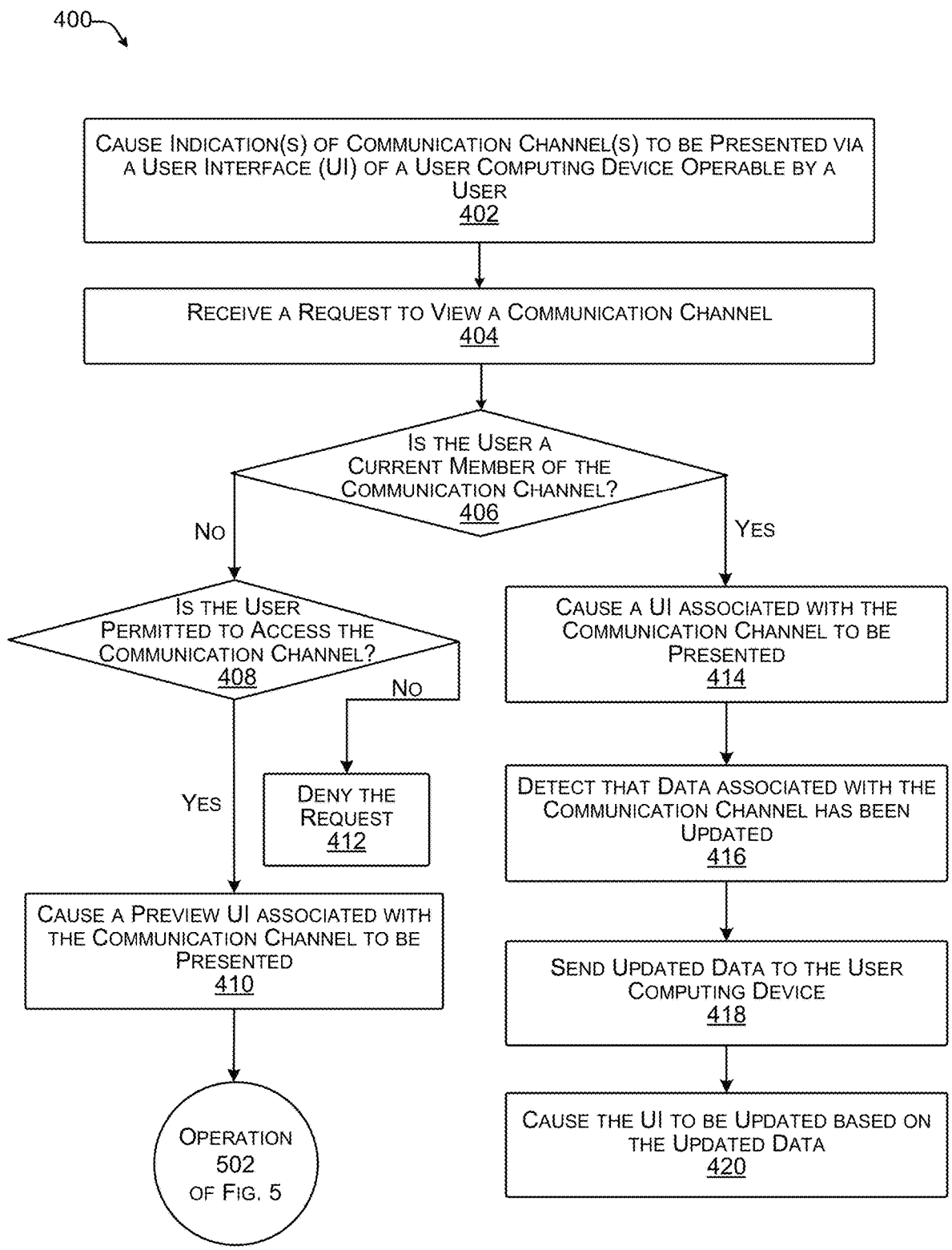
FIG. 4 illustrates an example process for causing a user interface associated with a communication channel to be presented via a user computing device, as described herein.
Figure 5:
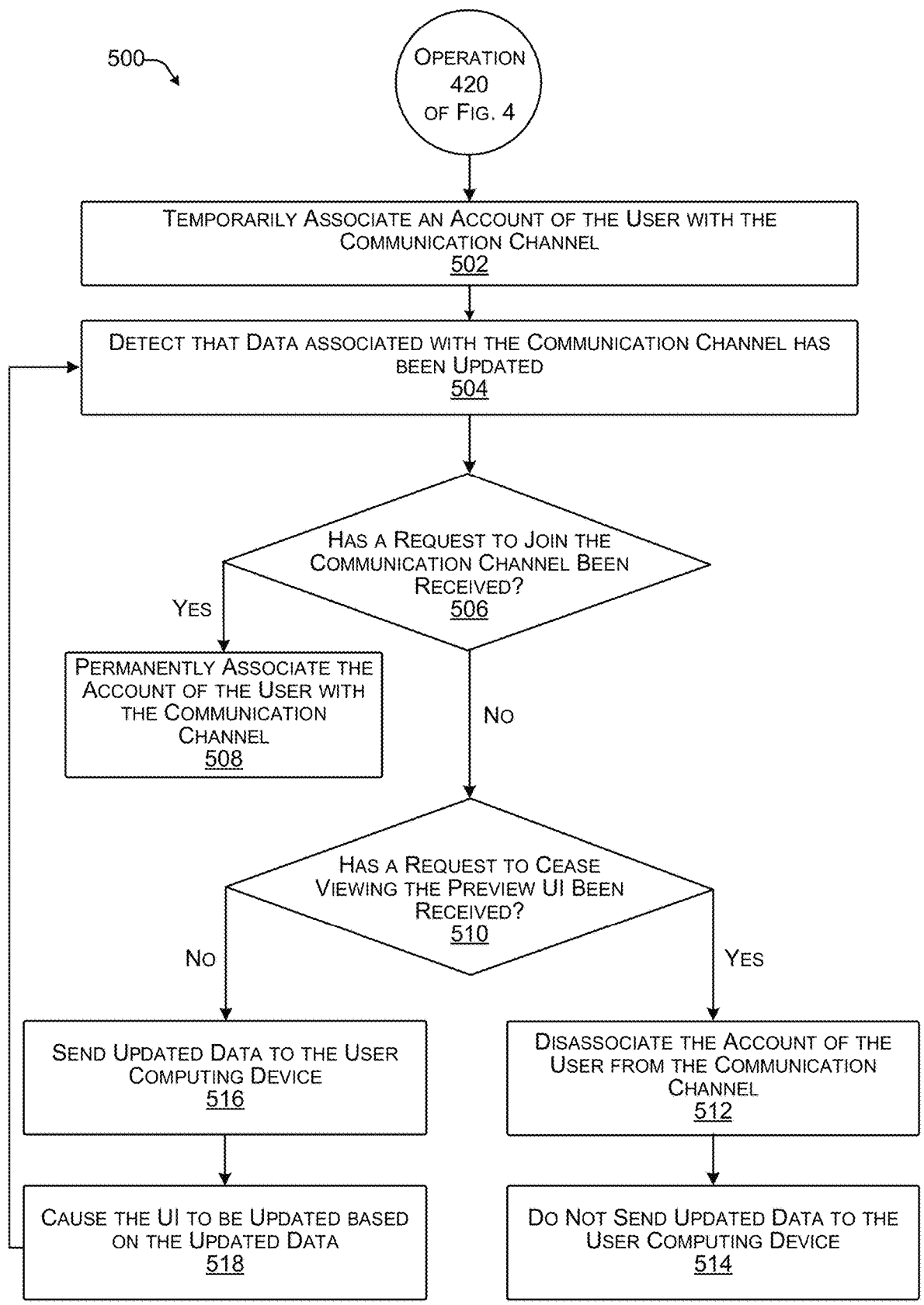
FIG. 5 illustrates an example process for causing a preview user interface to be updated in real time and/or near-real time, as described herein.
Figure 6:
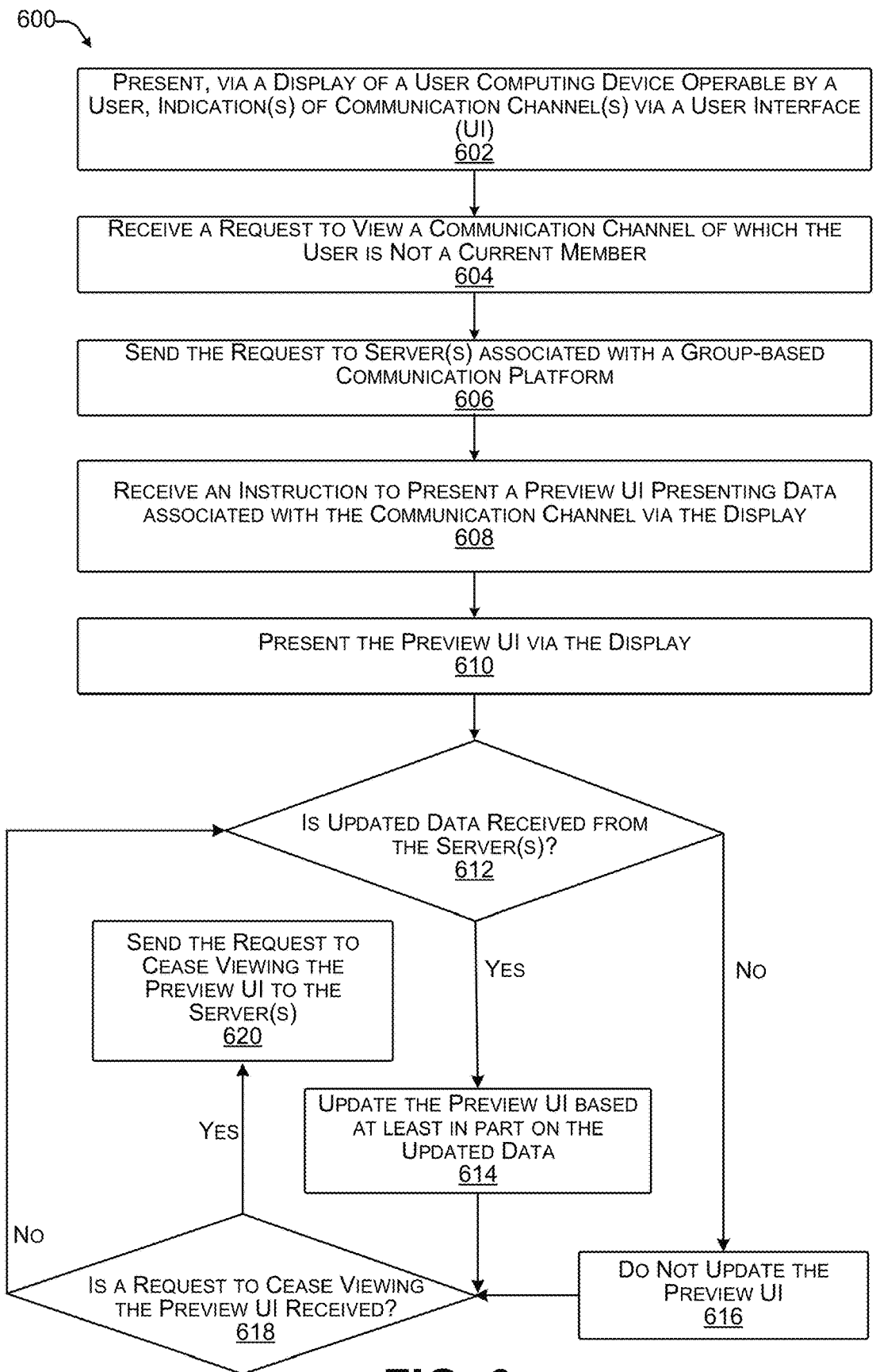
FIG. 6 illustrates an example process for presenting and/or updating a preview user interface on a user computing device, as described herein.

FIGS. 4-6 are flowcharts showing example processes involving techniques as described herein. The processes illustrated in FIGS. 4-6 are described with reference to components described above with reference to the environment 100 shown in FIG. 1 for convenience and ease of understanding. However, the processes illustrated in FIGS. 4-6 are not limited to being performed using the components described above with reference to the environment 100. Moreover, the components described above with reference to the environment 100 are not limited to performing the processes illustrated in FIGS. 4-6.

The processes in FIGS. 4-6 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 4-6 can be combined in whole or in part with each other or with other processes.

FIG. 4 illustrates an example process 400 for causing a user interface associated with a communication channel to be presented via a user computing device, as described herein.

At operation 402, the channel management component 116 can cause indication(s) of communication channel(s) to be presented via a user interface (UI) of a user computing device 104 operable by a user. In at least one example, the user data 122 and/or the permission data 124 can store data indicating which communication channel(s) a user is (a) a member of and/or (b) has permission to access. In at least one example, the channel management component 116 can send data and/or instructions to the application 136, indicating which communication channel(s) to present, and the application 136 can present a user interface to be presented via a display of the user computing device 104. In at least one example, the user interface can include indication(s) of the communication channel(s). An example user interface is provided above with reference to FIG. 1.

At operation 404, the channel management component 116 can receive a request to view a communication channel.

In at least one example, the user can desire to access data associated with a communication channel. In at least one example, the user can interact with the user interface 140, for example by providing an input associated with the indication that corresponds to the communication channel. In some examples, the indication can be associated with a mechanism, that when actuated, provides the input indicating that the user desires to access data associated with the communication channel. In at least one example, the application 136 can send an indication of the input to the server(s) 102. That is, the application 136 can detect the input and send a request associated with the input to the server(s) 102. The request can comprise a request to preview the communication channel. In at least one example, the request can be associated with a communication channel identification that is associated with the communication channel and a user identifier associated with the user. In at least one example, the channel management component 116 can receive the request.

At operation 406, the channel management component 116 can determine whether the user is a current member of the communication channel. Based at least in part on receiving the request, the channel management component 116 can determine whether the user is a member of the communication channel. That is, the channel management component 116 can utilize the user identifier associated with the request to determine whether the user data (e.g., in the user data 122) indicates that the user is a member of the communication channel.

At operation 408, the channel management component 116 can determine whether the user is permitted to access the communication channel. Based at least in part on receiving the request and determining that the user is not a current member of the communication channel (i.e., "no" at operation 406), the channel management component 116 can determine whether the user has permission to access the communication channel. That is, the channel management component 116 can utilize the user identifier associated with the request to determine whether the permissions data 124 and/or the user data (e.g., in the user data 122) indicate that the user has permission to access the communication channel. So long as the user has permission to access the communication channel (i.e., "yes" at operation 408), the channel management component 116 can access channel data associated with the communication channel in the channel data 126. That is, the channel management component 116 can utilize the communication channel identification to access channel data stored in association with the physical address in the channel data 126 where related data of that communication channel is stored.

At operation 410, the channel management component 116 can cause a preview user interface associated with the communication channel to be presented. In at least one example, the channel management component 116 can send at least a portion of the channel data to the application 136 and the application 136 can present the channel data, or a portion thereof, via the user interface 140, as illustrated in FIG. 1. That is, the channel management component 116 can cause the channel data associated with the communication channel to be presented via the user interface 140. In at least one example, the channel data associated with the communication channel can be associated with a "preview user interface," or a preview of the communication channel that can be presented via the user interface 140. In some examples, the preview of the communication channel can be presented via the user interface 140, as described above with reference to FIG. 1. However, in some examples, the preview of the communication channel can be presented via a new user interface, a pop-up, an overlay, or other user interface element. Based at least in part on causing the preview UI to be presented via the communication channel, the process 400 can proceed to operation 502 of process 500 in FIG. 5.

In at least one example, if the user is not permitted to access the communication channel (i.e., "no" at operation 408), the channel management component 116 can deny the request, as illustrated at operation 412.

At operation 414, the channel management component 116 can cause a user interface associated with the communication channel to be presented. That is, based at least in part on determining that the user is a current member of the communication channel (i.e., "yes" at operation 406), the channel management component 116 can cause a user interface associated with the communication channel to be presented. In at least one example, the channel management component 116 can access channel data associated with the communication channel in the channel data 126. That is, the channel management component 116 can utilize the communication channel identification to access channel data stored in association with the physical address in the channel data 126 where related data of that communication channel is stored. In at least one example, the channel management component 116 can send at least a portion of the channel data associated with the communication channel to the application 136 and the application 136 can present the channel data, or portion thereof, via a user interface such as the user interface 140 described above with reference to FIG. 1. That is, the channel management component 116 can cause the channel data associated with the communication channel to be presented via the user interface 140.

At operation 416, the channel management component 116 can detect that data associated with the communication channel has been updated. In at least one example, the communication channel can be updated. For example, a user can post a new message in the communication channel, members can be added to and/or removed from the communication channel, file(s) can be uploaded and/or removed from the communication channel, application(s) can be added to and/or removed from the communication channel, a description can be added to, modified, and/or removed from the communication channel, a property of the communication channel can be modified, etc. In at least one example, the channel management component 116 can receive such an update and detect that the data associated with the communication channel has been updated.

At operation 418, the channel management component 116 can send updated data to the user computing device 104. In at least one example, because the user is a member of the communication channel, the channel management component 116 can send the updated data associated with the communication channel as soon as it is received, or shortly thereafter. That is, the channel management component 116 can send the updated data to the user computing device 104 in real time or near-real time. In at least one example, the application 136 can update the user interface 140 based at least in part on the updated data received. That is, the channel management component 116 can cause the UI to be updated based on the updated data, as illustrated at operation 420.

As described above, for each communication channel of which the user is a current member (e.g., the user account is associated with the corresponding communication channel), the channel management component 116 can send updated data associated therewith to the user computing device 104 as it is received (e.g., in real time or in near-real time), as described by operations 414-418. However, if a user is not a member of a communication channel, the channel management component 116 may not send updated data to such a communication channel (e.g., in an effort to conserve computing resources, enforce security, and/or improve performance of the group-based computing platform) unless the user is (i) permitted to access data associated with such a communication channel and (ii) the user is viewing a preview user interface associated with such a communication channel. Additional details associated with causing data associated with a communication channel of which the user is not a current member are described below.

FIG. 5 illustrates an example process 500 for causing a preview user interface to be updated in real time and/or near-real time, as described herein.

At operation 502, the channel management component 116 can temporarily associate an account of the user with the communication channel. Based at least in part on (i) receiving the request to view the communication channel of which the user is not currently a member (i.e., "no" at operation 406) and (ii) determining that the user is permitted to access the communication channel (i.e., "yes" at operation 408), the channel management component 116 can temporarily associate the user (i.e., a user account of the user) with the communication channel. In at least one example, the channel management component 116 can temporarily associate the user account with the communication channel identifier (e.g., for a limited duration). In some examples, the channel management component 116 can associate a user computing device and/or an access point associated with the user account with the communication channel identifier (e.g., as illustrated and/or described in FIG. 3). Based at least in part on the user being associated with the communication channel, the channel management component 116 can send data and/or updated data to the application 136 while the user is viewing the preview user interface, in real time or near-real time, even though the user is not a current member of the communication channel. In some examples, the operation 502 can occur at a same time or a different time as the operation 410. In some examples, the operation 502 can occur before the operation 410 or after the operation 410.

At operation 504, the channel management component 116 can detect that data associated with the communication channel has been updated. In at least one example, the communication channel can be updated. For example, a user can post a new message in the communication channel, members can be added to and/or removed from the communication channel, file(s) can be uploaded and/or removed from the communication channel, application(s) can be added to and/or removed from the communication channel, post(s) (data that can be edited collaboratively, in near real-time by one or members of a communication channel) added to and/or removed from the communication channel, a description can be added to, modified, and/or removed from the communication channel, a property of the communication channel can be updated, etc. In at least one example, the channel management component 116 can receive such an update and detect that the data associated with the communication channel has been updated.

At operation 506, the channel management component 116 can determine whether a request to join the communication channel has been received. In at least one example, the user can interact with the preview user interface to indicate that the user desires to join the communication channel. For instance, the user can actuate a control (e.g., the control 150, in FIG. 1) or provide another indication of his or her desire to join the communication channel. If the user joins the communication channel, the channel management component 116 can update the association between the user and the communication channel to permanently associate the account of the user with the communication channel (e.g., an association of unlimited duration), as illustrated at operation 508, and, as a result, the application 136 can receive data and/or updated data from the server(s) 102 so long as the user is a member of the communication channel.

At operation 510, the channel management component 116 can determine whether a request to cease viewing the preview UI has been received. In at least one example, if the user has not joined the communication channel as a member (i.e., "no" at operation 506), the channel management component 116 can determine whether the user is still viewing the preview user interface. In at least one example, the user can determine to leave the preview user interface without joining the communication channel. In such an example, the user can provide an input indicating that the user desires to cease viewing the preview user interface. For example, the user can request to view another communication channel, or the user can request to view a direct message thread. The application 136 can receive such an input and determine a request to cease viewing the preview user interface has been received. In at least one example, when the user leaves the preview user interface, the application 136 can send the request and/or an indication of such to the channel management component 116. Based at least in part on receiving such a request and/or indication (i.e., "yes" at operation 510), the channel management component 116 can terminate the association between the user and the communication channel, as illustrated at operation 512. Based at least in part on terminating the association between the user and the communication channel, the channel management component 116 can refrain from sending updated data to the user computing device 104, as illustrated at operation 514, and the application 136 may no longer receive data and/or updated data for the communication channel.

At operation 516, the channel management component 116 can send updated data to the user computing device 104. In at least one example, so long as the user is still viewing the preview user interface and/or a request to cease viewing the preview user interface has not been received (i.e., "no" at operation 510), and because the user account is temporarily associated with the communication channel, the channel management component 116 can send updated data to the user computing device 104. In at least one example, the channel management component 116 can send the updated data associated with the communication channel as soon as it is received, or shortly thereafter. That is, the channel management component 116 can send the updated data to the user computing device 104 in real time or near-real time. In at least one example, the application 136 can update the user interface 140 based at least in part on the updated data received. That is, the channel management component 116 can cause the UI to be updated based on the updated data, as illustrated at operation 518. The process 500 can return to operation 504 to determine whether additional updated data has been received.

While operations 510 and 512 describe that temporary associations are conditioned on whether a preview user interface is still being presented via a user interface, the temporary associations described herein can be otherwise conditioned. For example, instead of terminating the temporary association based on receiving a request to cease viewing the preview user interface, as described above, in some examples, the temporary association between the user account and the communication channel can have a predetermined time duration (e.g., 5 minutes, 30 minutes, 1 hour, 24 hours, etc.), after which the association between the user and the communication channel can be terminated and/or the preview can be conditioned on the application window being in a foreground of the display of the user computing device 104.

While the channel management component 116 is described as the single component performing server-side operations in processes 400 and 500, in some examples, the channel management component 116 can comprise multiple components, which, in some examples, can be distributed across individual ones of the server(s) 102. For instance, in at least one example, a first component, associated with a first server of the server(s) 102, can handle temporary subscriptions as described herein (e.g., at operation 502), while a second component, associated with a second server of the server(s) 102, can handle permanent subscriptions (e.g., at operation 508). In other examples, the first and second components can be associated with a same server of the server(s) 102.

FIG. 6 illustrates an example process 600 for presenting and/or updating a preview user interface on a user computing device, as described herein.

At operation 602, the application 136 can present, via a display of a user computing device 104 operable by a user, indication(s) of communication channel(s) via a user interface (UI). As described above with reference to operation 402, the channel management component 116 can cause indication(s) of communication channel(s) to be presented via a user interface (UI) of a user computing device 104 operable by a user. In at least one example, the user data 122 and/or the permission data 124 can store data indicating which communication channel(s) a user is (a) a member of and/or (b) has permission to access. In at least one example, the channel management component 116 can send data and/or instructions to the application 136, indicating which communication channel(s) to present, and the application 136 can present a user interface to be presented via a display of the user computing device 104. In at least one example, the user interface can include one or more indications of the one or more communication channels. An example user interface is provided above with reference to FIG. 1.

At operation 604, the application 136 can receive a request to view a communication channel of which the user is not a current member. In at least one example, the user can desire to access data associated with a communication channel. In at least one example, the user can interact with the user interface 140, for example by providing an input associated with the indication that corresponds to the communication channel. In some examples, the indication can be associated with a mechanism, that when actuated, provides the input indicating that the user desires to access data associated with the communication channel. In at least one example, the application 136 can receive the input, which can represent a request to view the communication channel, and can send the request, or an indication thereof, to the server(s) 102, as illustrated at operation 606. In at least one example, the request can comprise a request to preview the communication channel. In at least one example, the request can be associated with a communication channel identification that is associated with the communication channel and a user identifier associated with the user.

At operation 608, the application 136 can receive an instruction to present a preview UI presenting data associated with the communication channel via the display. In at least one example, the channel management component 116 access channel data associated with the communication channel and can send at least a portion of the channel data to the application 136. In at least one example, the channel data can be associated with an instruction to present a preview user interface. In at least one example, the application 136 can present the channel data, or a portion thereof, via the user interface 140, as illustrated at operation 610 (and as illustrated above with respect to FIG. 1). In at least one example, the channel data associated with the communication channel can be associated with a "preview user interface," or a preview of the communication channel that is presented via the user interface 140. In some examples, the preview of the communication channel can be presented via the user interface 140, as described above with reference to FIG. 1. However, in some examples, the preview of the communication channel can be presented via a new user interface, a pop-up, an overlay, or other user interface element.

In at least one example, the preview user interface can be associated with one or more permissions. In some examples, the one or more permissions can permit viewing of data associated with the communication channel but may restrict modification or editing of the data associated with the communication channel. For example, as described above, a user may view any messages, files, documents, links, membership lists, organization lists, and other properties (e.g., collectively "content") of the communication channel. In some examples, while the user can view the content within the communication channel, the user may not be permitted to interact with content in the communication channel, edit content in the communication channel, or post any messages or data to the communication channel.

At operation 612, the application 136 can determine whether updated data is received from the server(s) 102. In at least one example, the communication channel can be updated. For example, a user can post a new message in the communication channel, members can be added to and/or removed from the communication channel, file(s) can be uploaded and/or removed from the communication channel, application(s) can be added to and/or removed from the communication channel, a description can be added to, modified, and/or removed from the communication channel, a property of the communication channel can be modified, etc. In at least one example, the channel management component 116 can receive such an update and detect that the data associated with the communication channel has been updated. In at least one example, because the user account is temporarily associated with the communication channel, the channel management component 116 can send the updated data associated with the communication channel as soon as it is received, or shortly thereafter. That is, the channel management component 116 can send the updated data to the user computing device 104 in real time or near-real time. In at least one example, the application 136 can receive the updated data (i.e., "yes" at operation 612) and can update the user interface 140 based at least in part on the updated data received, as illustrated at operation 614. In some examples, if the update is associated with data that is not presented via the third region 146, or sub-pane, that can be associated with communications occurring within a communication channel, and is presented via a details sub-pane upon actuation of the control 152, such data may not be updated until the details sub-pane is presented. That is, an update may not be immediately presented via the user interface 140, but can be accessible in near-real time.

At operation 616, the application 136 can refrain from updating the preview UI. If the application 136 does not receive updated data (i.e., "no" at operation 612), the application 136 may not update the preview user interface.

At operation 618, the application 136 can determine whether a request to cease viewing the preview UI is received. As described above, in at least one example, the user can determine to leave the preview user interface without joining the communication channel. In such an example, the user can provide an input indicating that the user desires to cease viewing the preview user interface. For example, the user can request to view another communication channel, or the user can request to view a direct message thread. The application 136 can receive such an input and determine a request to cease viewing the preview user interface has been received. In at least one example, when the user leaves the preview user interface (i.e., "yes" at operation 618), the application 136 can send the request and/or an indication of such to the channel management component 116, as illustrated at operation 620. Based at least in part on receiving such a request and/or indication, the channel management component 116 can terminate the association between the user and the communication channel. That is, the user's temporary membership to the communication channel can be terminated. Based at least in part on terminating the association between the user and the communication channel, the channel management component 116 can refrain from sending updated data to the user computing device 104, as described above, and the application 136 may no longer receive data and/or updated data for the communication channel.

Based at least in part on determining that a request to cease viewing the preview UI has not been received (i.e., "no" at operation 618), the process 600 can return to operation 612 to determine whether updated data has been received from the server(s) 102.

As described above, techniques described herein enable users to modify communication channel membership "on the fly" (e.g., in real time or near-real time). That is, the systems (e.g., FIG. 1), processes (e.g., processes 400-600), and other techniques described herein allow users to receive data and/or updates for communication channels for which they desire to receive such data and/or updates, but also enable users to access data and/or updates in other communication channels of which they are not members (but have permission to access). Such techniques enable the group-based communication platform to maintain performance and conserve computing and/or network resources, by refraining from sending data and/or updates for communication channels of which the user is not a member. That is, techniques described herein reduce the amount of data exchanged between and among users of the group-based communication platform and stored on user computing devices associated with the group-based communication platform. Yet, techniques described herein still enable users to access data associated with other channels (for which they have permission to access) in real time or near-real time. That is, techniques described herein provide both performance efficiencies and access control, by allowing users to preview the data they are interested in and allowed to view, and refraining from transmitting data to user computing devices and/or access points that are not previewing communication channels of which users are not currently members. The aforementioned techniques further enable cleaner, less cluttered user interfaces, while still allowing users to preview data associated with other channels (for which they have permission to access) in real time or near-real time. Techniques described herein therefore provide an improved user experience for users of the group-based communication platform.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method, implemented at least in part by a server computing device associated with a group-based communication platform, comprising:
   receiving, from a client of a user associated with the group-based communication platform, a first request to preview a communication channel, wherein:
      the communication channel is associated with one or more members of the communication channel that have access to data associated with the communication channel via a user interface associated with the group-based communication platform, and
      the user is excluded from the one or members of the communication channel and does not have access to the user interface;
   based at least in part on receiving the first request, causing a preview user interface to be presented via a display of the client, wherein the preview user interface presents the data associated with the communication channel;
   detecting, while the preview user interface is being presented via the display, an update made to the data associated with the communication channel; and
   based at least in part on detecting the update, causing the preview user interface to be updated to include updated data associated with the communication channel.

2. The method of claim 1, further comprising:
   based at least in part on receiving the first request, temporarily associating an account of the user with the communication channel; and
   causing the preview user interface to be updated based at least in part on the account of the user being temporarily associated with the communication channel.

3. The method of claim 2, further comprising:
   receiving, from the client, a second request to cease viewing the preview user interface; and
   disassociating the account of the user with the communication channel based at least in part on receiving the second request.

4. The method of claim 1, wherein the preview user interface includes a control, that when actuated by the user, causes an account of the user to be associated with the communication channel as a member of the communication channel.

5. The method of claim 1, wherein the communication channel is at least one of:
   a public communication channel which the user has permission to access; or
   a shared communication channel associated with members of different organizations.

6. The method of claim 1, wherein the communication channel is associated with a group with which the user is associated.

7. The method of claim 1, wherein the data associated with the communication channel comprises one or more items, and wherein an item of the one or more items comprises:
   a message;
   a file attachment;
   a change to a membership of a user associated with the communication channel;
   an application associated with the communication channel; or
   a property of the communication channel.

8. The method of claim 7, wherein the preview user interface is associated with one or more permissions, the one or more permissions permitting viewing of the one or more items and restricting modifications to the one or more items.

9. The method of claim 1, wherein the client comprises a first access point associated with a first instance of the preview user interface, the method further comprising sending the updated data to the client to update the first instance of the preview user interface and sending the updated data to a second access point associated with a second instance of the preview user interface.

10. A system comprising:
    one or more processors;
    one or more computer-readable media storing instructions, that when executed by the one or more processors, cause the system to perform operations comprising:
        causing a plurality of indications associated with a plurality of communication channels to be presented via a user interface output via a display of a client associated with a user, wherein:
            a communication channel of the plurality of communication channels is associated with one or more members of the communication channel that have access to data associated with the communication channel via a user interface associated with a group-based communication platform, and
            the user is excluded from the one or members of the communication channel;
        receiving, from the client, a first request to preview the communication channel;
        based at least in part on receiving the first request, causing a preview of the communication channel to be presented via the user interface, wherein the preview presents the data associated with the communication channel via the user interface; and
        sending, to the client, updated data associated with the communication channel while the preview is being presented via the user interface.

11. The system of claim 10, the operations further comprising:
    detecting that, while the preview is being presented via the user interface, the data associated with the communication channel has been updated by another user;
    sending updated data to the client based at least in part on detecting that the data has been updated by the other user; and
    causing the preview to be updated to include the updated data associated with the communication channel.

12. The system of claim 10, the operations further comprising:
    based at least in part on receiving the first request, temporarily associating an account of the user with the communication channel; and
    sending the updated data to the client based at least in part on the account of the user being temporarily associated with the communication channel.

13. The system of claim 12, the operations further comprising:
    receiving, from the client, a second request to cease viewing the preview; and
    disassociating the account of the user with the communication channel based at least in part on receiving the second request.

14. The system of claim 10, the operations further comprising:
    accessing, in a database associated with the system, an account associated with the user; and
    in response to determining, based at least in part on the account and one or more permissions, that the communication channel is accessible to the user, causing the preview to be presented.

15. The system of claim 10, wherein the communication channel comprises at least one of:
    a public communication channel of which the user has permission to access; or
    a shared communication channel associated with members of different organizations.

16. One or more non-transitory computer-readable media storing instructions, that when executed by one or more processors, cause the one or more processors to perform operations comprising:
    causing an indication of at least one communication channel to be presented via a user interface output via a display of a client associated with a user, wherein:
        the communication channel is associated with one or more members of the communication channel that have access to data associated with the communication channel via a user interface associated with a group-based communication platform, and
        the user is excluded from the one or members of the communication channel;
    receiving, from the client, a first request to preview the communication channel;
    based at least in part on receiving the first request, causing a preview of the communication channel to be presented via the user interface, wherein the preview presents the data associated with the communication channel via the user interface; and
    sending, to the client, updated data associated with the communication channel while the preview is being presented via the user interface.

17. The one or more non-transitory computer-readable media of claim 16, the operations further comprising:
    based at least in part on receiving the first request, temporarily associating an account of the user with the communication channel; and
    sending the updated data to the client based at least in part on the account of the user being temporarily associated with the communication channel.

18. The one or more non-transitory computer-readable media of claim 17, the operations further comprising:
   receiving, from the client, a second request to cease viewing the preview; and
   disassociating the account of the user with the communication channel based at least in part on receiving the second request.

19. The one or more non-transitory computer-readable media of claim 16, the operations further comprising sending the updated data to a first instance of the user interface presenting the preview and a second instance of the user interface presenting the preview.

20. The one or more non-transitory computer-readable media of claim 16, wherein the preview presented via the user interface is associated with one or more permissions, the one or more permissions permitting viewing of one or more items associated with the data associated with the communication channel and restricting modifications to the one or more items.

\* \* \* \* \*